(12) United States Patent
Park (10) Patent No.: US 12,277,383 B2
(45) Date of Patent: Apr. 15, 2025

(54) SYSTEM AND METHOD FOR AUTOMATIC NUMBERING OF FOOTNOTE NUMBERS

(71) Applicant: JNPMEDI INC., Incheon (KR)

(72) Inventor: Young Yong Park, Incheon (KR)

(73) Assignee: JNPMEDI INC., Incheon (KR)

( * ) Notice: Subject to any disclaimer, the term of this patent is extended or adjusted under 35 U.S.C. 154(b) by 0 days.

(21) Appl. No.: 18/215,569

(22) Filed: Jun. 28, 2023

(65) Prior Publication Data

US 2024/0020464 A1    Jan. 18, 2024

(30) Foreign Application Priority Data

Jul. 12, 2022 (KR) ........................ 10-2022-0085482

(51) Int. Cl.
*G06F 40/166* (2020.01)
*G06F 16/903* (2019.01)
(Continued)

(52) U.S. Cl.
CPC ...... *G06F 40/169* (2020.01); *G06F 16/90344* (2019.01); *G06F 16/93* (2019.01)

(58) Field of Classification Search
CPC ... G06F 40/169; G06F 16/93; G06F 16/90344
See application file for complete search history.

(56) References Cited

U.S. PATENT DOCUMENTS

| 4,648,067 A | 3/1987 | Repass et al. |
| 8,276,090 B2 * | 9/2012 | Chen ..................... G06F 9/543 715/255 |

(Continued)

FOREIGN PATENT DOCUMENTS

| JP | H01-42417 B2 | 9/1989 |
| JP | H11-45255 A | 2/1999 |

(Continued)

OTHER PUBLICATIONS

"Add footnotes and endnotes in Word on Mac and iOS", Microsoft, 2021 Link: https://web.archive.org/web/20210506205853/https://support.microsoft.com/en-us/office/add-footnotes-and-endnotes-in-word-on-mac-and-ios-a58d1685-94f6-43f5-ba26-aa15aa62c6ed.

(Continued)

*Primary Examiner* — Mahelet Shiberou
(74) *Attorney, Agent, or Firm* — Bridgeway IP Law Group, PLLC; Sang Ho Lee; Hyun Woo Shin (57) ABSTRACT

A system for footnote number automatic numbering includes: a document editing unit for receiving a footnote creation request from a user terminal and providing a footnote content input function; a reference management unit for receiving footnote content, which includes reference information, from the document editing unit, and creating a reference list which includes the footnote content; and a footnote number numbering unit for receiving a footnote number creation request from the document editing unit, generating a footnote number corresponding to the footnote number creation request in consideration of the presence of footnotes in the document being written on the user terminal and the location where the footnote will be entered, and (Continued)

providing the generated footnote number to the document editing unit, wherein the document editing unit receives the footnote number received from the footnote number numbering unit and automatically inputs the footnote number at the location where the footnote will be entered.

6 Claims, 4 Drawing Sheets

(51) Int. Cl.
  *G06F 16/9032* (2019.01)
  *G06F 16/93* (2019.01)
  *G06F 40/169* (2020.01)

(56) References Cited

U.S. PATENT DOCUMENTS

| | | | | |
|---|---|---|---|---|
| 10,430,445 | B2* | 10/2019 | Crouch | G06F 16/313 |
| 2006/0218492 | A1* | 9/2006 | Andrade | G06F 40/166 |
| | | | | 715/234 |
| 2014/0208192 | A1* | 7/2014 | Zaric | G06F 40/30 |
| | | | | 715/205 |
| 2016/0171058 | A1* | 6/2016 | Choi | G06F 16/9032 |
| | | | | 707/725 |
| 2016/0321215 | A1* | 11/2016 | Marks | G06F 3/0484 |
| 2020/0278971 | A1* | 9/2020 | Tuboguchi | G06F 16/248 |

FOREIGN PATENT DOCUMENTS

| | | |
|---|---|---|
| JP | 2013-528885 A | 7/2013 |
| KR | 10-2008-0053927 A | 6/2008 |
| KR | 10-1629210 B1 | 6/2016 |
| WO | 2011/159843 A2 | 12/2011 |

OTHER PUBLICATIONS

"How to keep the footnote(endnote) reference numbers when pasting text between two documents?", MSOfficeForums, vBulletin Solutions Inc., 2015 Link: https://www.msofficeforums.com/word/28311-how-keep-footnote-endnote-reference-numbers-when.html.

Wyatt, Allen, "Changing the Way Footnotes Are Numbered (Microsoft Word)", Tips. Net, Sharon Parq Associates, Inc., Last updated Oct. 2, 2021 Link: https://wordribbon.tips.net/T005973_Changing_the_Way_Footnotes_Are_Numbered.html.

Chen, Vera, "3 Ways to View All Footnotes at Once in your Word Document", DataNumen, Inc., Mar. 7, 2017 Link: https://web.archive.org/web/20221126232740/https://www.datanumen.com/blogs/3-ways-view-footnotes-word-document/.

* cited by examiner

SYSTEM AND METHOD FOR AUTOMATIC NUMBERING OF FOOTNOTE NUMBERS

CROSS-REFERENCE TO RELATED APPLICATION

This application claims priority to Korean Patent Application No. 10-2022-0085482, filed on Jul. 12, 2022, in the Korean Intellectual Property Office, the entire disclosure of which is incorporated herein by reference.

BACKGROUND OF THE INVENTION

Field of the Invention

The present invention relates to a system and a method for automatic numbering of footnote numbers.

Background Art

In modern society, the trend is to perform tasks in an electronic form such as creating, storing, and sharing documents for ease of task execution, storage, transmission, efficient collaborative task performance, and untact task performance.

In creating a document, in a case in which explanations for words or contents are added into the main text, or documents like academic journal articles, reports, clinical trial case records, etc. are created, or in a case in which the works of others are incorporated, to verify the validity of the content of the created document, to grant credibility, to note the source of the works, footnotes must be marked on relevant words or phrases, explanations for the words or phrases must provided, or information about the references must be provided.

However, in a case of creating a document containing a large amount of content or multiple documents, there are inconveniences in remembering and numbering footnote numbers for multiple references or in inputting information about references in full, and mistakes may occur. In addition, in a case of copying content including footnotes in creating a document, there is inconvenience of having to modify the footnote numbers in the document after checking the footnote numbers.

SUMMARY OF THE INVENTION

Accordingly, the present invention has been made to solve the above-mentioned problems occurring in the prior arts, and it is an object of the present invention to provide a system and method for automatic numbering of footnote numbers, which stores footnotes and footnote contents in an interconnected manner when creating a document, automatically numbers footnote numbers when copying contents of a document including footnotes, and automatically generates a list of items of references according to circumstances.

The technical objects of the present invention are not limited to the technical objects, and other technical objects not mentioned can be clearly understood by those skilled in the art from the below descriptions.

To accomplish the above object, according to the present invention, there is provided a system for footnote number automatic numbering including: a document editing unit for receiving a footnote creation request from a user terminal and provides a footnote content input function; a reference management unit for receiving footnote content, which includes reference information, from the document editing unit, and creating a reference list which includes the footnote content; and a footnote number numbering unit for receiving a footnote number creation request from the document editing unit, generating a footnote number corresponding to the footnote number creation request in consideration of the presence of footnotes in the document being written on the user terminal and the location where the footnote will be input, and providing the generated footnote number to the document editing unit, wherein the document editing unit receives the footnote number received from the footnote number numbering unit and automatically inputs the footnote number at the location where the footnote will be input.

The document editing unit includes: a keyword search unit for providing a keyword search function that searches for keywords included in the document being written on the user terminal or at least one previously stored document; and a region designation request unit for providing a content copying function to the user terminal in linkage with the keyword search unit.

The keyword search unit provides at least one document including the keyword, among the document being written on the user terminal and at least one previously stored document, to a document list, and also provides a portion or all of the content related to the keyword.

The region designation request unit requests a region designation to be copied on the user terminal and confirms the presence of footnotes in the designated region.

when at least one footnote is included in the designated region, the region specification request unit requests creation of a footnote number to the footnote number numbering unit, receives a footnote number for at least one footnote from the footnote number numbering unit, and changes at least one footnote number included in the designated region.

The document editing unit stores the footnote created in response to the footnote creation request and the footnote content in an interlinked manner, and when the content copying function is provided, and when at least one footnote is included in the content to be copied, the region designation request unit copies the content of the footnote stored in linkage with the footnote.

The reference management unit automatically inputs and updates the list of references into the reference list of the document being written on the user terminal.

In another aspect of the present invention, there is provided a method for footnote number automatic numbering, by an automatic footnote numbering system, the method comprising: receiving a footnote creation request from a user terminal and providing a footnote content input function; confirming the presence of footnote in a document being written on the user terminal according to the footnote creation request; generating a footnote number in consideration of a location where a footnote corresponding to the footnote creation request will be input, and inputting the footnote number at the location where the footnote will be input; storing the footnote content input from the user terminal in conjunction with the input footnote; and when the footnote content includes information about the reference, creating or updating a reference list which includes information about the reference.

The method further comprising: providing a keyword search function that searches for keywords included in the document being written on the user terminal or at least one previously stored document; and providing at least one document including the keyword, among the document being written on the user terminal and at least one previously stored document, to a document list.

The step of providing the document list comprises providing a portion or all of the contents related to the keyword.

The method further comprising: requesting region designation for copying on the user terminal; and confirming whether footnotes are included in the designated region.

The method further comprising: when at least one footnote is included in the designated region, confirming footnotes are included in the document being written, and changing the footnote number of at least one footnote considering the location where the designated region for copying will be input in the document being written.

The method further comprising: when at least one footnote is included in the designated region, copying and automatically inputting the content of the footnote stored in conjunction with at least one footnote.

The method further comprising: when at least one footnote is included in the designated region and the content of the footnote stored in conjunction with at least one footnote is related to reference information, updating the content of the footnote stored in conjunction with at least one footnote in the reference list.

Specific details of other embodiments are included in the detailed description and drawings.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

To clarify the technical idea of the present invention, a detailed description of the preferred embodiments of the present invention will be made with reference to the attached drawings. In describing the present invention, a detailed description of related notification functions or components that can unnecessarily obscure the gist of the invention will be omitted. Even if displayed on different drawings, identical reference numbers and symbols have been assigned to components with substantially the same functional configuration. For the convenience of explanation, a device and a method will be described together as needed.

Hereinafter, the term "unit" is defined herein as having its broadest definition to ordinary skill in the art to refer to software including instructions executable in a non-transitory computer-readable medium that would perform the associated function when executed, a circuit or a processor designed to perform the associated function, hardware designed to perform the associated function, or a combination of them.

Figure 1:
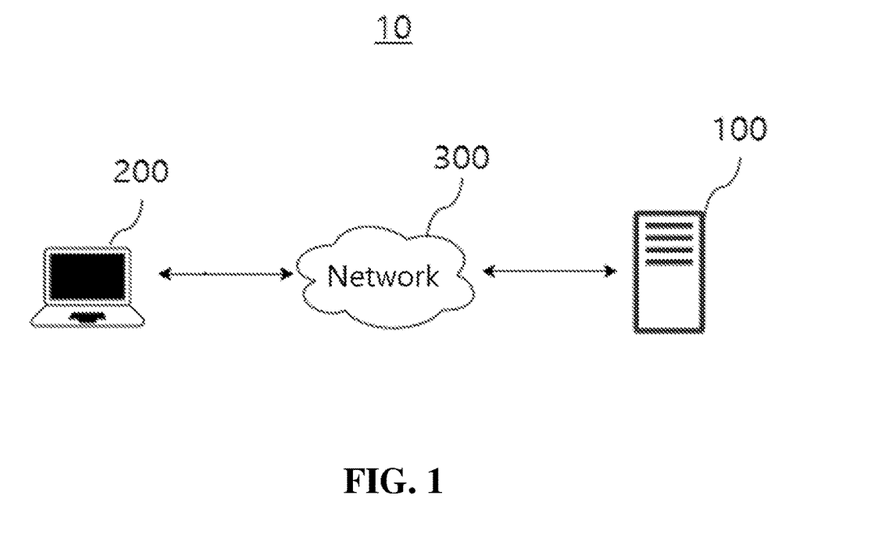
FIG. 1 is an overview diagram showing a network configuration of a footnote number automatic numbering system according to an embodiment of the present invention.

FIG. 1 is an overview diagram illustrating a network configuration of a footnote number automatic numbering system according to an embodiment of the present invention.

Referring to FIG. 1, a network configuration 10 of the footnote number automatic numbering system according to an embodiment can include a footnote number automatic numbering system 100, a user terminal 200, and a network 300.

The footnote number automatic numbering system 100 can provide an application program, an application and/or a website to a user terminal 200, and provide a document creation and management service, which allows the user terminal 200 to create and manage documents through the provided application program, application and/or website.

In a case in which the user terminal 200 generates a footnote for at least one of words, sentences, and paragraphs and inputs footnote contents during document creation, the footnote number automatic numbering system 100 can automatically number the footnote numbers for the footnotes generated by the user terminal 200 by checking the presence of footnotes in the document and the already generated footnote numbers, and can store the footnote contents corresponding to the generated footnote created by the user terminal 200 in linkage with the corresponding footnote.

Moreover, the footnote number automatic numbering system 100 can provide a keyword search function to the user terminal 200. For example, the footnote number automatic numbering system 100 can provide a keyword search function for words, contents, and the likes included in the document being written or already stored by the user terminal 200.

The user terminal 200 can copy at least one of the words, sentences, or paragraphs of the document being written or already stored through the footnote number automatic numbering system 100. In a case in which at least one footnote is included in the copied words, sentences, or paragraphs, the footnote number automatic numbering system 100 can automatically number the footnote number for the at least one of the footnotes, and can also automatically input the footnote contents corresponding to the footnote.

The footnote number automatic numbering system 100 can automatically update the reference list, for example, the contents of a table of references in the copied document, in the copied document in a case in which the footnote contents of the copied footnote is a reference footnote.

In this specification, the footnote includes a content footnote that supplementarily explains the contents of the main text and a reference footnote for indicating the source of citation, and the footnote contents can mean an explanation about the corresponding footnote, for example, supplementary contents for a word, a sentence, or a paragraph specified as a footnote or contents about the source of citation, input at the bottom of the main text where the footnote was input.

As described above, the footnote number automatic numbering system 100 according to an embodiment automatically numbers the footnote numbers, stores and manages the footnote contents in linkage with the footnote. In a case in which a user copies the contents from the document in which the user is writing the content containing the footnote or from another document, the footnote number automatic numbering system 100 automatically numbers the footnote numbers for the copied document, copies the footnote contents corresponding to the footnote, and updates the reference list, so can be advantageous in reducing the user's inconvenience and mistakes existing when writing a document A detailed description of the footnote number automatic numbering system 100 according to an embodiment will be described later with reference to FIGS. 2 to 4.

The user terminal 200 is a device capable of data communication with the system 100 through a wired or wireless communication network, such as the Internet and/or Intranet. For instance, the user terminal 200 may be a mobile terminal, such as a laptop, a handheld device, a smartphone, a tablet PC, a desktop computer, or any device that uses or is directly or indirectly connected to such a device.

The user terminal 200 can store and run application programs and/or applications provided by the footnote number automatic numbering system 100, or access a website to use various services provided by the footnote number automatic numbering system 100.

Although not specifically described in this specification regarding the configuration of the user terminal 200, the user terminal 200 may include a communication unit for data communication with the footnote number automatic numbering system 100, an input/output interface device for providing information to a user, who uses the user terminal 200, or receiving input. Since various electronic devices known in the technical field of the present invention may be applied to the user terminal 200, detailed descriptions thereof are omitted.

The network 300 may be configured as a communication network (Communication Network) through which the footnote number automatic numbering system 100 and the user terminal 200 communicate with each other, without specifically referring to the communication form. For instance, the network 300 may be configured as various communication networks, such as personal area network (PAN), local area network (LAN), metropolitan area network (MAN), wide area network (WAN), but is not limited thereto.

Figure 2:
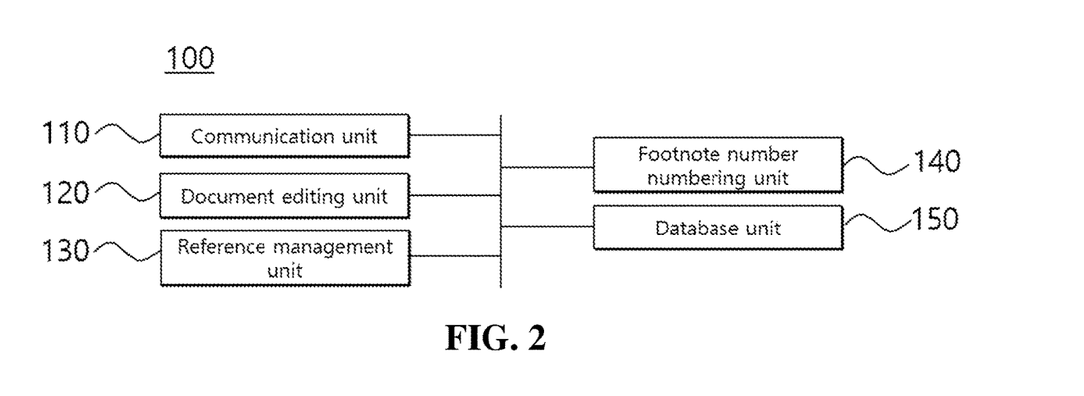
FIG. 2 is a block diagram schematically illustrating the configuration of the footnote number automatic numbering system according to an embodiment of the present invention.
Figure 3:
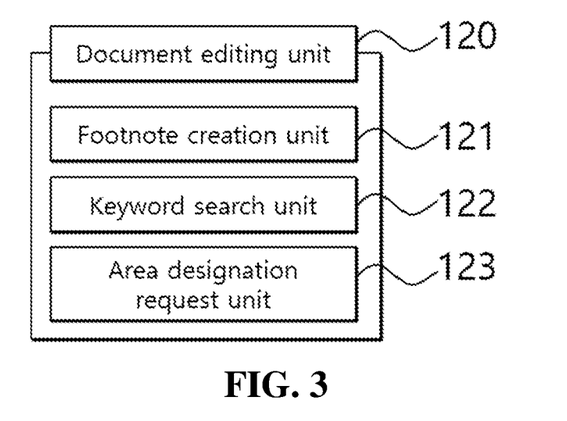
FIG. 3 is a block diagram schematically illustrating the configuration of a document editing unit according to an embodiment of the present invention.
Figure 4:
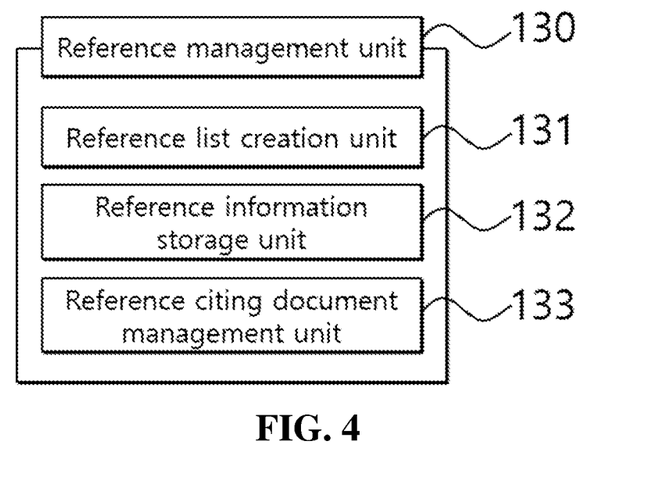
FIG. 4 is a block diagram schematically illustrating the configuration of a reference management unit according to an embodiment of the present invention.

FIG. 2 is a block diagram schematically illustrating the configuration of the footnote number automatic numbering system according to an embodiment of the present invention. FIG. 3 is a block diagram schematically illustrating the configuration of a document editing unit according to an embodiment of the present invention. FIG. 4 is a block diagram schematically illustrating the configuration of a reference management unit according to an embodiment of the present invention.

Hereinafter, the footnote number automatic numbering system 100 according to an embodiment is described with reference to FIGS. 2 to 4.

The footnote number automatic numbering system 100 according to one embodiment may include a communication unit 110, a document editing unit 120, a reference management unit 130, a footnote number numbering unit 140, and a database unit 150.

The communication unit 110 can communicate data with the user terminal 200 via the network 300 wired or wirelessly. The communication unit 110 can transmit and receive data between the footnote number automatic numbering system 100 and the user terminal 200 through at least one of various wired internet communication methods supporting transmission control protocol/internet protocol (TCP/IP), and various wireless communication methods, such as wideband code division multiple access (WCMDA), long term evolution (LTE), wireless broadband internet (WiBro), and wireless fidelity (WiFi).

The document editing unit 120 can provide document creation and document editing functions to the user terminal 200. For example, the document editing unit 120 can provide at least one template for document writing to the user terminal 200 through an application program, an application, and a website. The document editing unit 120 can provide a document stored in the database unit 150 to the user terminal 200 according to the request of the user terminal 200. Furthermore, the document editing unit 120 can store the written document in the database unit 150 when the user terminal 200 finishes writing the document. In some embodiments, the document editing unit 120 can also provide a content table generation function to the user terminal 200.

Referring to FIG. 3, the document editing unit 120 according to an embodiment may include a footnote creation unit 121, a keyword search unit 122, and an area designation request unit 123.

When receiving a footnote creation request from the user terminal 200, the footnote creation unit 121 can provide a footnote number creation request to the footnote numbering unit 140. The footnote creation unit 121 can receive the footnote number corresponding to the footnote number creation request from the footnote numbering unit 140, and automatically input the footnote number at the location corresponding to the footnote number creation request.

When receiving a footnote creation request from the user terminal 200, the footnote creation unit 121 can provide a footnote content input function. For example, the footnote content input function of the footnote creation unit 121 may be a function to move an input cursor of the user terminal 200 to the bottom of the text requested for footnote creation, or may be a function to provide a text box in a popup form to the user terminal 200 and input the content inputted in the text box as footnote content at the bottom of the text requested for footnote creation, but is not limited thereto.

When providing the footnote content input function to the user terminal 200, the footnote creation unit 121 can provide information of at least one reference. For example, the footnote creation unit 121 can provide information of at least one reference stored in the reference management unit 130 to the user terminal 200. As another example, the footnote creation unit 121 can recognize at least one word (or, keyword) inputted by the user terminal 200 at the bottom of the text or in the text box, and provide the reference information corresponding to the word to the user terminal 200.

The footnote creation unit 121 can store the footnote content inputted from the user terminal 200 through the footnote content input function, linked with the corresponding footnote. Moreover, in a case in which the footnote content relates to reference information, the footnote creation unit 121 can provide the footnote content, i.e., reference information, to the reference management unit 130.

The keyword search unit 122 can provide a keyword search function for words, contents, etc., contained in a document being written on the user terminal 200 or in an already stored document. For example, the keyword search unit 122 can provide a text box for keyword input to the user terminal 200 in a popup window form or in a form placed on any one of the edges of the document being written.

In a case in which the user terminal 200 inputs at least one keyword in the text box for keyword input, the keyword search unit 122 can provide a document list which includes the keyword from at least one document being written or stored in the database unit 150 to the user terminal 200. Here, when providing the document list, the keyword search unit 122 can also provide some or all of the contents related to the keyword contained in each document to the user terminal 200.

In a case in which the user terminal 200 selects one of the documents included in the document list, the keyword search unit 122 can provide the selected document to the user terminal 200. The keyword search unit 122 can provide the selected document such that the content including the keyword is displayed on the user terminal 200.

The area designation request unit 123 can provide a content copy function to the user terminal 200 in conjunction with the keyword search unit 122. In order to provide the content copy function, the area designation request unit 123 can request the user terminal 200 to designate an area for copying. For example, in a case in which the keyword search unit 122 provides the selected document to the user terminal 200, the area designation request unit 123 can request the user terminal 200 to designate an area. As a specific example, the area designation request unit 123 can request to drag an area for copying using an input device of the user terminal 200, for instance, a mouse, or a touch panel, but it is not limited thereto.

The area designation request unit 123 can check whether a footnote is included in the designated area. If the footnote is included in the designated area, the area designation request unit 123 can request footnote number creation to the footnote numbering unit 140. In this case, in a case in which a plurality of footnotes are included in the designated area, the area designation request unit 123 can request footnote number creation for each of the plurality of footnotes to the footnote numbering unit 140.

The area designation request unit 123 can receive the footnote number corresponding to the footnote number creation request from the footnote numbering unit 140, and change the number of the footnote included in the designated area, to automatically input the designated area into the document being written. In this case, the area designation request unit 123 can also automatically input the footnote content stored linked with the footnote included in the designated area into the bottom of the main text of the document being written.

Moreover, if the footnote content relates to reference information, the area designation request unit 123 can provide the footnote content, namely, reference information, to the reference management unit 130.

As described above, the document editing unit 120 according to an embodiment can automatically number the footnotes and provide a footnote content input function when the user terminal 200 creates a footnote during document writing, thereby allowing the user to make and manage footnotes in a document more conveniently, and preventing the user from making errors.

In addition, the document editing unit 120 can provide a keyword search function and a content copy function for the document being written and the stored document in the user terminal 200. In a case in which the copied content includes a footnote, the document editing unit 120 can automatically number the footnote number appropriately in the document being written, and also automatically input the footnote content corresponding to the footnote, thereby providing a more convenient document writing service to the user.

The reference management unit 130 can store and manage reference information related to at least one footnote, and automatically generate a reference list in the document being written on the user terminal 200.

Referring to FIG. 4, the reference management unit 130 according to an embodiment can include a reference list creation unit 131, a reference information storage unit 132, and a reference citing document management unit 133.

The reference list creation unit 131 can receive reference information from the document editing unit 120, and automatically create or update a reference list for the document being written on the user terminal 200.

For example, when receiving footnote content that includes reference information from the footnote creation unit 121 or the area designation request unit 123, the reference list creation unit 131 can create the reference list that includes the reference information corresponding to the document being written on the user terminal 200. If there is a reference list corresponding to the document being written, the reference list creation unit 131 can update the existing reference list by adding the received reference information from the footnote creation unit 121 or the keyword search unit 122 to the existing reference list.

In some embodiments, in a case in which there already exists a reference list in the document being written, the reference list creation unit 131 can also confirm whether the reference information received from the footnote creation unit 121 or the keyword search unit 122 duplicates at least one piece of reference information included in the existing reference list.

The reference list creation unit 131 can input the created and updated reference list in a reference item page of the document being written according to the settings of the user terminal 200. For example, the user terminal 200 can set whether to automatically input the reference list in the created document through the document editing unit 120. In another example, when the user terminal 200 creates a table of references through the content table creation function provided by the document editing unit 120 during document creation, the reference list creation unit 131 can create or update the reference list on the reference table page.

The reference list creation unit 131 can provide a reference list for a specific document to the reference information storage unit 132 and the reference citing document management unit 133.

The reference information storage unit 132 can store and manage the reference list received from the reference list creation unit 131. The reference information storage unit 132 can classify and manage multiple reference information included in multiple reference lists. For example, the reference information storage unit 132 can classify and store lots of reference information according to the type of references, e.g., papers, newspaper articles, books, reports, case records, etc., or store references with the same title in the same category, but is not limited thereto.

The reference citing document management unit 133 can store the reference list received from the reference list creation unit 131 in connection with corresponding document information, e.g., document title, creation date and time, author, document identification characters/numbers, etc.

The reference citing document management unit 133 can provide a document list, which have cited references, to the user terminal 200. For example, when receiving reference information from the user terminal 200, the reference citing document management unit 133 can provide a document list including document information about at least one document citing the received reference information.

Therefore, in accordance with an embodiment, when the footnote created by the user terminal 200 is for indicating the source, the reference management unit 130 can create a reference list for the document being written, and automatically create and update the reference list in the reference item page, thereby improving user convenience in creating a document and preventing the reference list from being accidentally omitted.

Referring to FIG. 2, the footnote number numbering unit 140 can number appropriate footnote numbers according to the requests of the footnote creation unit 121 and the area designation request unit 123.

For example, if the footnote number numbering unit 140 receives a footnote number creation request from the footnote creation unit 121 and the area designation request unit 123, the footnote number numbering unit 140 can confirm whether there is a footnote in the document being written by the user terminal 200. In addition, the footnote number numbering unit 140 can confirm the location of the footnote to be input according to the footnote number creation request.

Considering the presence or absence of a footnote in the document being written and the location of the footnote to be input, the footnote number numbering unit 140 can generate a footnote number and provide the generated footnote number to the footnote creation unit 121 or the area designation request unit 123. In addition, the footnote number numbering unit 140 can automatically change the existing footnote number in the document being written if necessary.

In a specific example, in a case in which there are three footnotes in the document being written and the footnote to be input is located after the three footnotes, the footnote number numbering unit 140 can generate the footnote number to be input as 4.

As another example, in a case in which there are three footnotes existing in the document being written and the footnote to be input is located between the second and third footnote from the beginning of the document, the footnote number numbering unit 140 can generate the number of the footnote to be input as 3, and change the number of the third footnote, i.e., the footnote of which the existing number is 3, to 4.

As described above, the footnote number numbering unit 140 automatically numbers the footnote created by the user terminal 20 or the footnote included in the copied content in consideration of the existence and location of the footnote in the document being written, and automatically change at least one footnote number existing in the document in consideration of the location and the number of the footnote to be input, thereby reducing inconvenience that the user has to remember and number or modify the numbers, locations, etc., of the footnotes already input every time a footnote is created.

Figure 5:
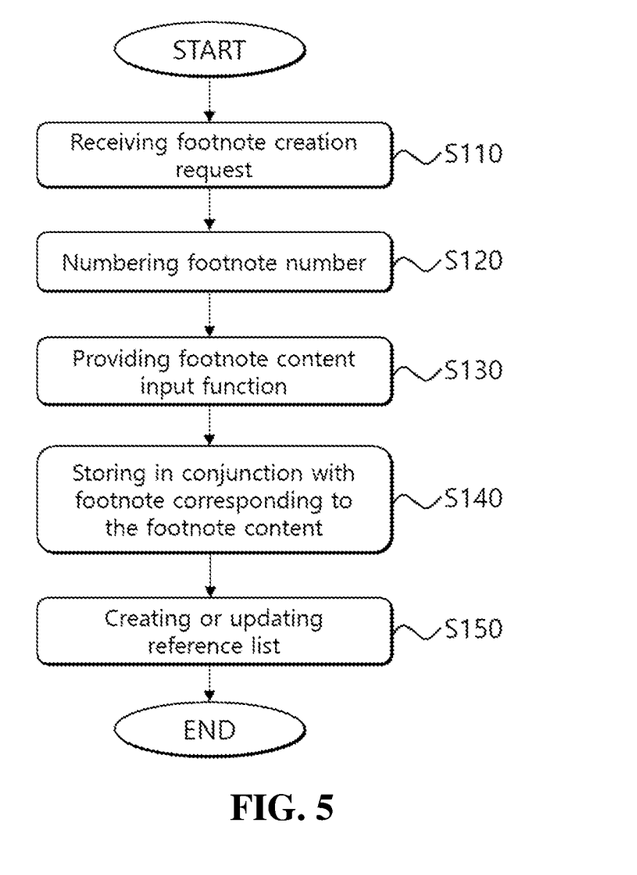
FIG. 5 is a flow chart for depicting a method for generating and storing footnote numbers and footnote contents according to an embodiment of the present invention.

FIG. 5 is a flow chart for depicting a method of creating and storing footnote numbers and footnote content according to an embodiment of the present invention.

Referring to FIGS. 1 to 5, the footnote number automatic numbering system 100 can receive a footnote creation request from the user terminal 200 (S110), and number a footnote number corresponding to the footnote creation request (S120).

For example, in a case in which the footnote creation unit 121 receives a footnote creation request from the user terminal 200, the footnote creation unit 121 can provide the footnote number creation request to the footnote number numbering unit 140. In this case, the footnote number numbering unit 140 can confirm whether a footnote exists in the document being written by the user terminal 200. Furthermore, the footnote number numbering unit 140 can confirm the location of the footnote to be input according to the footnote number creation request.

That is, in consideration of the existence of a footnote in the document being written and the location of the footnote to be input, the footnote number numbering unit 140 can generate a footnote number and provide the generated footnote number to the footnote creation unit 121. In addition, if necessary, the footnote number numbering unit 140 can automatically change the footnote number existing in the document being written.

Since the examples of footnote number creation by the footnote number numbering unit 140 are the same as those described above with reference to FIG. 2, detailed examples of the footnote number creation by the footnote number numbering unit 140 are omitted.

The footnote creation unit 121 can receive a footnote number corresponding to the footnote number creation request from the footnote number numbering unit 140, and automatically input the received footnote number at the location corresponding to the footnote number creation request.

Subsequently, the footnote number automatic numbering system 100 can provide a footnote content input function to the user terminal 200 (S130).

For example, when receiving a footnote creation request from the user terminal 200, the footnote creation unit 121 can provide a footnote content input function. For example, the footnote content input function of the footnote creation unit 121 may be a function to move an input cursor of the user terminal 200 to the bottom of the text requested for footnote creation, or may be a function to provide a text box in a popup form to the user terminal 200 and input the content inputted in the text box as footnote content at the bottom of the text requested for footnote creation, but is not limited thereto.

When providing the footnote content input function to the user terminal 200, the footnote creation unit 121 can provide information of at least one reference. For example, the footnote creation unit 121 can provide information of at least one reference stored in the reference management unit 130 to the user terminal 200. As another example, the footnote creation unit 121 can recognize at least one word (or, keyword) inputted by the user terminal 200 at the bottom of the text or in the text box, and provide the reference information corresponding to the word to the user terminal 200.

Next, the footnote number automatic numbering system 100 can store the footnote content linked with the corresponding footnote (S140).

For example, the footnote creation unit 121 can store the footnote content input from the user terminal 200 through the above-mentioned footnote content input function in linkage with the corresponding footnote. Furthermore, in a case in which the above-mentioned footnote content is about reference information, the footnote creation unit 121 can provide the footnote content, that is, the reference information, to the reference management unit 130.

Then, the footnote number automatic numbering system 100 can create or update a reference list (S150).

For example, when receiving footnote content, which includes reference information, from the footnote creation unit 121 or keyword search unit 122, the reference list creation unit 131 can create a reference list which includes the reference information corresponding to the document that the user terminal 200 is writing. If a reference list corresponding to the document being written exists, the reference list creation unit 131 can update the existing reference list by adding the reference information received from the footnote creation unit 121 or the keyword search unit 122 to the existing reference list.

In some embodiments, in a case in which a reference list already exists for the document being written, the reference list creation unit 131 can confirm whether the reference information received from the footnote creation unit 121 or keyword search unit 122 duplicates any of the reference information included in the existing reference list.

In addition, the reference list creation unit 131 can input the created and updated reference list to the reference item page of the document being written in accordance with the settings of the user terminal 200. For example, the user terminal 200 can set whether to automatically input the document creation reference list through the document editing unit 120. As another example, if the user terminal 200 creates a table of references through the content table creation function provided by the document editing unit 120 during document creation, the reference list creation unit 131 can create or update the reference list on the reference table page.

As described above, according to an embodiment, with the method for creating and storing footnote numbers and footnote content, when the user terminal 200 creates a footnote during document writing, The method may allow the user to create and manage footnotes in a documents and may be advantageous in preventing mistakes during document creation by automatically numbering the footnotes, providing a footnote content input function, and automatically creating and updating a reference list when the footnote is related to a reference.

Figure 6:
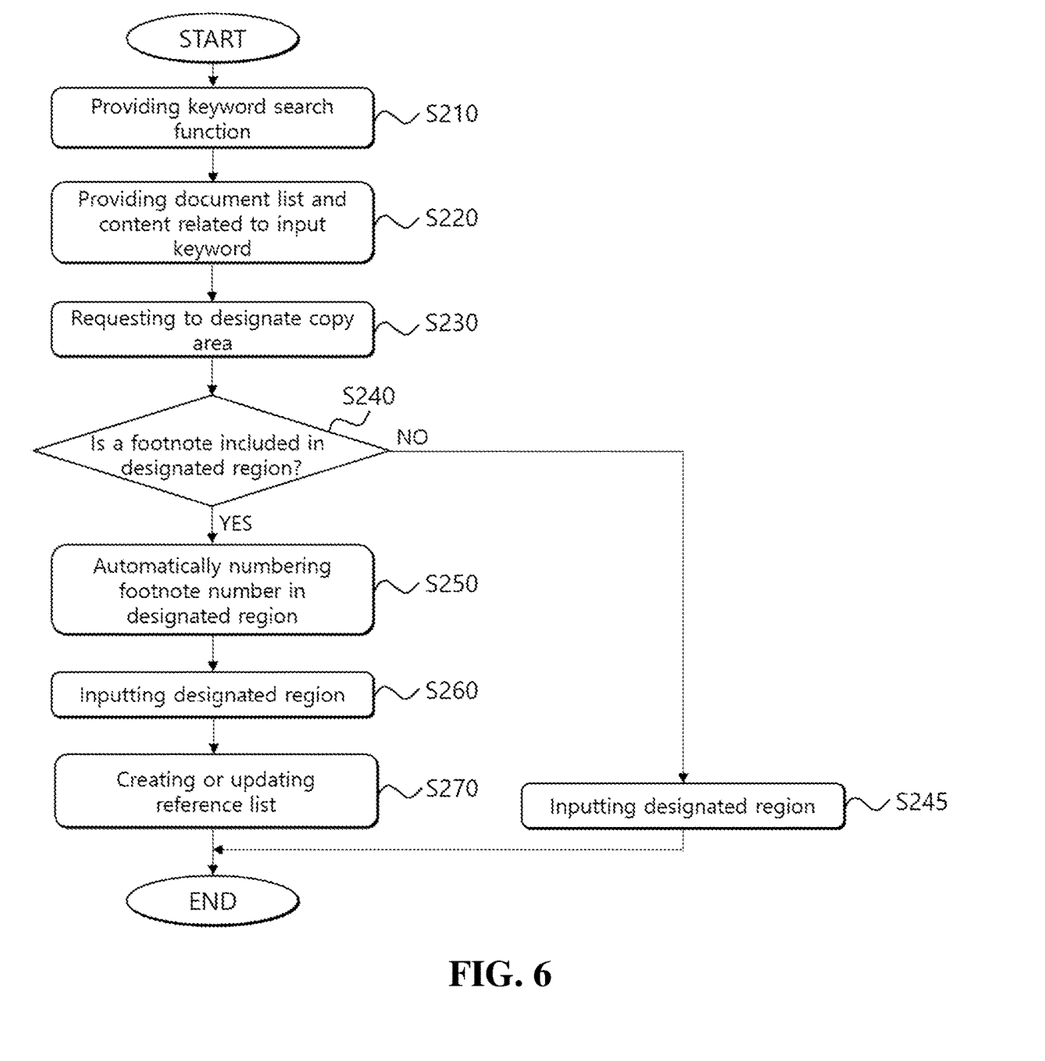
FIG. 6 is a flow chart for explaining a method for automatic numbering of footnote numbers according to an embodiment of the present invention.

FIG. 6 is a flowchart for depicting a method for footnote number automatic numbering according to 무 embodiment of the present invention.

First, the footnote number automatic numbering system 100 can provide a keyword search function to the user terminal 200 (S210).

The keyword search unit 122 can provide a keyword search function for words, contents, etc., contained in a document being written on the user terminal 200 or in an already stored document. For example, the keyword search unit 122 can provide a text box for keyword input to the user terminal 200 in a popup window form or in a form placed on any one of the edges of the document being written.

Next, the footnote number automatic numbering system 100 can provide the user terminal 200 with a list and content of documents related to the input keywords (S220).

In a case in which the user terminal 200 inputs at least one keyword in the text box for keyword input, the keyword search unit 122 can provide a document list which includes the keyword from at least one document being written or stored in the database unit 150 to the user terminal 200. Here, when providing the document list, the keyword search unit 122 can also provide some or all of the contents related to the keyword contained in each document to the user terminal 200.

In a case in which the user terminal 200 selects one of the documents included in the document list, the keyword search unit 122 can provide the selected document to the user terminal 200. The keyword search unit 122 can provide the selected document such that the content including the keyword is displayed on the user terminal 200.

Then, the footnote number automatic numbering system 100 can request the user terminal 200 to designate a copy area (S230).

In order to provide the content copy function, the area designation request unit 123 can request the user terminal 200 to designate an area for copying. For example, in a case in which the keyword search unit 122 provides the selected document to the user terminal 200, the area designation request unit 123 can request the user terminal 200 to designate an area. As a specific example, the area designation request unit 123 can request to drag an area for copying using an input device of the user terminal 200, for instance, a mouse, or a touch panel, but it is not limited thereto.

Next, the footnote number automatic numbering system 100 can confirm whether a footnote is contained in the designated area (S240), and can automatically number the footnote numbers when the footnote is contained in the designated area (S250).

The area designation request unit 123 can check whether a footnote is included in the designated area. If the footnote is included in the designated area, the area designation request unit 123 can request footnote number creation to the footnote numbering unit 140. In this case, in a case in which a plurality of footnotes are included in the designated area, the area designation request unit 123 can request footnote number creation for each of the plurality of footnotes to the footnote numbering unit 140.

The footnote number numbering unit 140 can generate footnote numbers in consideration of the presence of footnotes in the document being written and the location of the footnotes to be input, and can provide the generated footnote numbers to the area designation request unit 123. Additionally, if necessary, the footnote number numbering unit 140 can automatically change the footnote numbers existing in the document being written.

Since the example of footnote number generation by the footnote number numbering unit 140 is the same as described above with reference to FIG. 2, a specific example of footnote number generation by the footnote number numbering unit 140 is omitted.

If there is no footnote within the designated area, the area designation request unit 123 can automatically input the designated area into the document being written (S245).

Subsequently, the automatic footnote numbering system 100 can input the designated area into the document being written (S260).

The area designation request unit 123 can receive the footnote number corresponding to the footnote number creation request from the footnote numbering unit 140, and change the number of the footnote included in the designated area, to automatically input the designated area into the document being written. In this case, the area designation request unit 123 can also automatically input the footnote content stored linked with the footnote included in the designated area into the bottom of the main text of the document being written.

Moreover, if the footnote content relates to reference information, the area designation request unit 123 can provide the footnote content, namely, reference information, to the reference management unit 130.

Finally, the automatic footnote numbering system 100 can create or update the reference list (S270).

For example, when receiving footnote content including reference information from the area designation request unit 123, the reference list creation unit 131 can create a reference list including the reference information corresponding to the document being written by the user terminal 200. If a reference list corresponding to the document being written exists, the reference list creation unit 131 can update the existing reference list by adding the reference information received from the footnote creation unit 121 or keyword search unit 122.

In some embodiments, in a case in which a reference list already exists in the document being written, the reference list creation unit 131 can confirm whether the reference information received from the footnote creation unit 121 or keyword search unit 122 is duplicated with at least one of the reference information included in the existing reference list.

The reference list creation unit 131 can input the created and updated reference list in a reference item page of the document being written according to the settings of the user terminal 200. For example, the user terminal 200 can set whether to automatically input the reference list in the created document through the document editing unit 120. In another example, when the user terminal 200 creates a table of references through the content table creation function provided by the document editing unit 120 during document creation, the reference list creation unit 131 can create or update the reference list on the reference table page.

As described above, according to an embodiment, the method for footnote number automatic numbering can provide a keyword search function and a content copying function for documents being written on the user terminal 200 and documents already stored, and in a case in which the copied content includes footnotes, the method can automatically number the footnote numbers suitably for the document being written, and automatically input the content corresponding to the footnotes, thereby providing a more convenient document writing service to users.

In addition, if necessary, the method can automatically change the footnote number of at least one footnote existing in the document being written in consideration of the location and number of the footnote included in the copied content, thereby reducing inconvenience that the user has to remember and number or modify the numbers, locations, etc., of the footnotes already input every time a footnote is created.

Furthermore, when writing a plurality of documents related to a clinical trial, including, for example, a clinical trial plan and a clinical trial result report, the method can be advantageous in consistently managing the footnote content related to references.

As described above, the present invention has been described focusing on the preferred embodiments illustrated in the drawings. Such embodiments are merely illustrative, not limitative, and should be considered from an explanatory rather than a restrictive perspective. The true technical protection scope of the present invention should be determined by the technical idea of the attached claims, not the description. Even though specific terms have been used in this specification, they are used only for the purpose of describing the concept of the present invention, not for limiting the meaning or restricting the scope of the present invention stated in the claims. Each step of the present invention does not necessarily need to be performed in the order stated, and can be performed in parallel, selectively, or individually. it will be understood by those skilled in the art that various modifications and equivalents can be made without deviating from the spirit or scope of the invention.

It should be understood that equivalents includes not only the currently disclosed equivalents but also future developed equivalents, in other words, all components invented to perform the same function regardless of structure.

What is claimed is:

1. A system for footnote number automatic numbering, the system comprising:
    a document editor to receive a footnote creation request from a user terminal and provide a footnote content input function;
    a reference manager to receive footnote content including reference information from the document editor and create a reference list including the footnote content; and
    a footnote number generator to receive a footnote number creation request from the document editor, generate a footnote number corresponding to the footnote number creation request in consideration of presence of footnotes in a document being written on the user terminal and a location where a footnote corresponding to the footnote number is to be input, and provide the footnote number to the document editor,
    wherein the document editor is configured to receive the footnote number received from the footnote number generator and automatically input the footnote number at the location where the footnote is to be input,
    wherein the document editor comprises:
    a keyword searcher to provide a keyword search function that searches for at least one keyword included in the document being written on the user terminal or at least one previously stored document; and
    a region designation requester to provide a content copying function to the user terminal in linkage with the keyword searcher,
    wherein the keyword searcher is configured to provide at least one document including the at least one keyword, among the document being written on the user terminal and the at least one previously stored document, to a document list, and also provide a portion or all of a content of the at least one document related to the at least one keyword,
    wherein the region designation requester is configured to request a designation of a region of the at least one document including the at least one keyword to copy the region on the user terminal and confirm presence of footnotes in the region, and
    wherein when at least one footnote is included in the region, the region designation requester is configured to request creation of at least one footnote number to the footnote number generator, receive the at least one footnote number for the at least one footnote from the footnote number generator, and change the at least one footnote number included in the region.

2. The system according to claim 1,
    wherein the document editor is configured to store the footnote created in response to the footnote creation request and the footnote content in an interlinked manner, and
    wherein when the content copying function is provided and when at least one footnote is included in a content to be copied, the region designation requester is configured to copy the footnote content stored in linkage with the footnote.

3. The system according to claim 1, wherein the reference manager is configured to automatically input and update the reference list into a reference list of the document being written on the user terminal.

4. A method for footnote number automatic numbering by an automatic footnote numbering system, the method comprising:
    receiving a footnote creation request from a user terminal and providing a footnote content input function;
    confirming presence of footnotes in a document being written on the user terminal according to the footnote creation request;
    generating a footnote number in consideration of a location where a footnote corresponding to the footnote creation request is to be input, and inputting the footnote number at the location where the footnote is to be input;
    storing a footnote content input from the user terminal in conjunction with the footnote;
    when the footnote content includes information about a reference, creating or updating a reference list including the information about the reference;
    providing a keyword search function that searches for at least one keyword included in the document being written on the user terminal or at least one previously stored document;
    providing at least one document including the at least one keyword, among the document being written on the user terminal and at least one previously stored document, to a document list;
    requesting a designation of a region of the at least one document including the at least one keyword to copy the region on the user terminal;
    confirming whether at least one footnote is included in the region;
    when the at least one footnote is included in the region, confirming whether footnotes are included in the document being written, changing at least one footnote number of the at least one footnote in consideration of a location where the region that is copied is to be input in the document being written, and copying and automatically inputting at least one footnote content stored in conjunction with the at least one footnote.

5. The method according to claim 4, wherein the providing of the document list comprises providing a portion or all of contents related to the at least one keyword.

6. The method according to claim 4, further comprising:
    when the at least one footnote is included in the region and the at least one footnote content stored in conjunction with the at least one footnote is related to reference information, updating the at least one footnote content stored in conjunction with the at least one footnote in the reference list.

* * * * *